United States Patent [19]

Berrie et al.

[11] 3,905,951

[45] Sept. 16, 1975

[54] AZO DYESTUFFS CONTAINING A 1-LOWER ALKYL-6-HYDROXYPYRID-2-ONE COUPLING COMPONENT

[75] Inventors: Alistair Howard Berrie; Nigel Hughes, both of Manchester, England

[73] Assignee: Imperial Chemical Industries Limited, London, England

[22] Filed: June 23, 1969

[21] Appl. No.: 835,751

[30] Foreign Application Priority Data
June 27, 1968 United Kingdom............. 30763/68

[52] U.S. Cl............ 260/156; 260/294.9; 260/295 R; 260/295 AM
[51] Int. Cl.² ..................... C09B 29/36; D06P 3/52
[58] Field of Search....................... 260/156, 146 R

[56] References Cited
UNITED STATES PATENTS
2,431,190   11/1947   Morgan............................ 260/156 X
3,487,066   12/1969   Ritter et al......................... 260/156

Primary Examiner—Floyd D. Higel
Attorney, Agent, or Firm—Cushman, Darby & Cushman

[57] ABSTRACT

Water-insoluble monoazo dyestuffs of the formula:

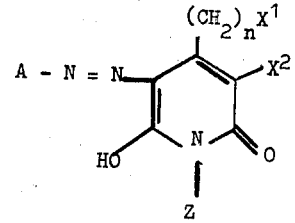

wherein A is an optionally substituted aryl radical, $n$ is 0 or 1, Z is an optionally substituted alkyl or aryl radical, one of $X^1$ and $X^2$ is hydrogen, optionally substituted alkyl or aryl or —CN, —COR, —COOR or —CONR$^1$R$^2$ and the other is —CN, —COOR —COR or —CONR$^1$R$^2$, R being optionally substituted alkyl or aryl and R$^1$ and R$^2$ being independently hydrogen or optionally substituted alkyl or aryl.

The use of the said dyestuffs for colouring synthetic textile materials.

7 Claims, No Drawings

AZO DYESTUFFS CONTAINING A 1-LOWER ALKYL-6-HYDROXYPYRID-2-ONE COUPLING COMPONENT

This invention relates to water-insoluble monoazo dyestuffs which are valuable for colouring synthetic textile materials in particular aromatic polyester textile materials.

According to the invention there are provided the water-insoluble monoazo dyestuffs free from sulphonic acid and carboxylic acid groups which, in one of the possible tautomeric forms, are represented by the formula:

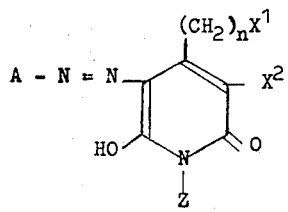

wherein A is an optionally substituted aryl radical, $n$ is 0 or 1, Z is an optionally substituted alkyl or aryl radical, one of $X^1$ and $X^2$ is a hydrogen atom or an optionally substituted alkyl or aryl radical or a —CN, —COOR, —COR or —CONR$^1$R$^2$ radical, and the other of $X^1$ and $X^2$ is a —CN, —COOR, —COR or —CONR$^1$R$^2$ radical, R is an optionally substituted alkyl or aryl radical, and R$^1$ and R$^2$ each independently represent a hydrogen atom or an optionally substituted alkyl or aryl radical or R$^1$ and R$^2$ together form with the nitrogen atom N a 5- or 6-membered nitrogen-containing heterocyclic ring.

The monoazo dyestuffs of the invention can exist in a number of tautomeric forms. For convenience the dyestuffs have only been formulated in one of these forms, but it is to be understood that the specification includes within its scope the dyestuffs in any of the possible tautomeric forms.

As examples of the optionally substituted aryl radicals represented by A there may be mentioned optionally substituted naphthyl radicals, and preferably optionally substituted phenyl radicals, in particular phenyl radicals containing one or more substituents such as chlorine, bromine, cyano, trifluoromethyl, nitro, lower alkyl such as methyl, lower alkoxy such as methoxy, lower alkyl sulphonyl such as methylsulphonyl, lower alkyl carbonyl such as acetyl, acylamino such as acetylamino, di (lower alkyl) amino such as diethylamino, phthalyl (so as to form an anthraquinone nucleus), carbo lower alkoxy such as carbomethoxy and carboethoxy and hydroxy and lower alkoxy substituted derivatives thereof such as carbo-$\beta$-methoxyethoxy, carbo-$\beta$-hydroxyethoxy and carbo-$\beta$-($\beta'$-ethoxyethoxy ethoxy, sulphonamido and N - lower alkyl, N:N-di (lower alkyl) and N-phenyl derivatives thereof such as sulphon-N-methylamido, sulphon - N:N - di (ethyl) amido, sulphonanilide and sulphon-N-ethylanilide, carbonamido and N- lower alkyl and N:N - di (lower alkyl) derivatives thereof such as carbon-N-methylamido and carbon-N:N - di (ethyl) amido, and sulphamato (—OSO$_2$NH$_2$) and N- lower alkyl and N:N - di (lower alkyl) derivatives thereof.

Throughout this specification the terms "lower alkyl" and "lower alkoxy" are used to denote alkyl and alkoxy radicals respectively containing from 1 to 4 carbon atoms.

The optionally substituted alkyl radicals represented by Z, $X^1$, $X^2$, R, R$^1$ and R$^2$ are preferably optionally substituted lower alkyl radicals; and as examples of such radicals there may be mentioned lower alkyl such as methyl, ethyl, n-propyl and n-butyl, hydroxy lower alkyl radicals such as $\beta$-hydroxyethyl and $\beta$- or $\gamma$-hydroxypropyl, phenyl lower alkyl radicals such as benzyl and $\beta$-phenylethyl, and lower alkoxy lower alkyl radicals such as $\beta$-(methoxy or ethoxy)ethyl and $\gamma$-methoxypropyl. The optionally substituted aryl radicals represented by Z, $X^1$, $X^2$, R, R$^1$ and R$^2$ are preferably optionally substituted phenyl radicals; and as examples of such radicals there may be mentioned phenyl itself and tolyl, chlorophenyl, anisyl, bromophenyl and dimethylphenyl.

As examples of the 5- and 6-membered nitrogen-containing heterocyclic rings formed from R$^1$, R$^2$ and the nitrogen atom there may be mentioned morpholino, piperidino and pyrrolidino.

According to a further feature of the invention there is provided a process for the manufacture of the water-insoluble monoazo dyestuffs of the invention which comprises coupling a diazo compound of an amine of the formula A—NH$_2$ with a coupling component of the formula:

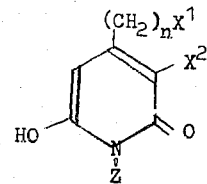

Formula 1 wherein A, $X^1$, $X^2$, Z and $n$ have the meanings stated, and the amine and coupling component are free from sulphonic acid and carboxylic acid groups.

The process of the invention can be conveniently carried out by adding the diazo compound, which can, for example, be in the form of a solution or suspension in an aqueous acidic medium, to a solution or suspension of the coupling component in water and/or a water-solubilising liquid optionally containing an inorganic acid or an alkali metal hydroxide or carbonate, if necessary adjusting the pH of the mixture to effect coupling, and thereafter isolating the resulting dyestuff by conventional methods.

As examples of the amines of the formula A—NH$_2$ there may be mentioned 1-naphthylamine or 2-chloro-1-naphthylamine, but more especially amines of the benzene series such as aniline, o-, m- or p-toluidine, o-, m- or p-anisilidine, o-, m- or p-chloroaniline, o-, m- or p-bromoaniline, o-, m- or p-nitroaniline, 2:5-dichloroaniline, 2:4-dinitroaniline, 2:4-dinitro-6-(chloro or bromo)aniline, 4-methanesulphonylaniline, 4-aminobenzotrifluoride, 4- or 5-nitro-2-toluidine, 4- or 5-nitro-2-anisidine, 4- or 5-chloro-2-anisidine, 4- or 5-chloro-2-toluidine, 4- or 5-bromo-2-anisidine, 2:6-di(chloro- or bromo-)-4-nitroaniline, 2:4:6-trinitroaniline, 2:4-dinitro-6-carbomethoxyaniline, 2-amino-5-nitrobenzotrifluoride, 2:4-bis(methanesulphonyl)aniline, 2-(chloro- or bromo-)-4-nitroaniline, methylanthranilate, 4- or 5-nitromethylanthranilate, 4-aminobenzamide, 2:6-di(chloro- or bromo-)-aniline-4-sulphonamide, 2:6-di(chloro- or bromo-)-4-methylsulphonylaniline, 2:5-di(chloro- or bromo-)-

4:6-di-nitroaniline, 2-amino-3:5-dinitrobenzotrifluoride, 3-amino-2-(chloro- or bromo-)-4:6-dinitro-(toluene or anisole), 3-amino-4-(chloro- or bromo-)-2:6-dinitro-(toluene or anisole), 2- or 4-cyanoaniline, 4-nitro-2-cyanoaniline, 2:4-dinitro-6-cyanoaniline, 2-nitro-4-cyanoaniline, 2-chloro-4-cyanoaniline, 4-aminodiphenyl, 1- or 2-aminoanthraquinone, 3-amino-2:4:6-trinitrotoluene, 2-(chloro- or bromo-)-4-methylsulphonylaniline, 3-(chloro- or bromo-)-4-thiocyanatoaniline, 2-(chloro- or bromo-)-4-sulphamylaniline, 2-amino-5-nitrophenylmethylsulphone, 2-amino-3:5-dinitrophenylmethylsulphone, 2-amino-3-(chloro- or bromo-)-5-nitrophenylmethylsulphone, 2-sulphamyl-4-nitroaniline, 2-methylsulphamyl-4-nitroaniline, 2-ethylsulphamyl-4-nitroaniline, 2-butylsulphamyl-4-nitroaniline, 2-dimethylsulphamyl-4-nitroaniline, 2-methylsulphamyl-4:6-dinitroaniline, 2-methylsulphamyl-4-nitro-6-(chloro- or bromo-)aniline, 2-phenylsulphamyl-4-nitroaniline, methyl 2-amino-3-(chloro- or bromo-)-5-nitrobenzoate, dimethyl 2-aminoterephthalate, dimethyl 2-amino-5-nitroterephthalate, β-methoxyethyl 4-aminobenzoate, β-hydroxyethyl 4-aminobenzoate, aniline 2-, 3- or 4-sulphamate, 2-amino-4-chlorophenyl sulphamate and aniline 2-, 3- or 4-N:N-dimethylsulphamate.

A preferred class of coupling components for use in the process of the invention comprises the componds of the formula:

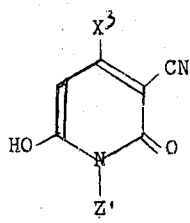

wherein Z' is an optionally substituted lower alkyl or phenyl radical and X³ is a lower alkyl radical. Preferably X³ is the methyl radical and Z' an optionally substituted lower alkyl radical in particular the ethyl or γ-methoxypropyl radical.

The coupling components of Formula I can themselves be obtained by a number of methods, such as are described, for example, in "Heterocyclic Compounds — Pyridine and its derivatives — Part 3" which was edited by Klingsberg and published by Interscience Publishers in 1962. Typical methods include, for example, (1) condensing together compounds of the formulae: X¹(CH₂)ₙCOCH₂COOalkyl and X²—CH₂COOalkyl in the presence of an excess of an amine of the formula Z—NH₂; (2) cyclisation of an α:β-disubstituted glutaconamide of the formula:

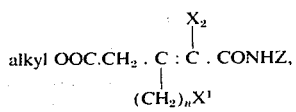

which is itself obtained by condensing together in the presence of a basic catalyst compounds of the formula X¹(CH₂)ₙ. CO.CH₂COOalkyl and X².CH₂.CONHZ; (3) by cyclisation of an α:β-disubstituted glutaconamide of the formula:

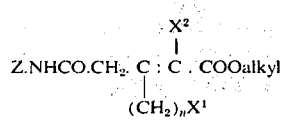

which is itself obtained by condensing together in the presence of a basic catalyst compounds of the formula X¹(CH₂)ₙCO.CH₂ CONZ and X²CH₂.COOalkyl.

As specific examples of the said coupling components there may be mentioned 1-(methyl or ethyl)-3-cyano-4-methyl-6-hydroxypyrid-2-one, 1-(β-hydroxyethyl or γ-methoxypropyl)-3-cyano-4-methyl-6-hydroxypyrid-2-one, 1-(phenyl, p-tolyl or p-anisyl)-3-cyano-4-(methyl or phenyl)-6-hydroxypyrid-2-one and 1-phenyl-3-(carbonamido- or carboethoxy)-4-(methyl or phenyl)-6-hydroxypyrid-2-one.

One preferred class of the monoazo dyestuffs of the invention comprises the dyestuffs wherein A represents an optionally substituted phenyl radical.

A second preferred class of the monoazo dyestuffs of the invention comprises the dyestuffs of the formula:

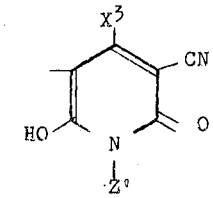

wherein A is an optionally substituted aryl radical and preferably an optionally substituted phenyl radical, Z' is an optionally substituted lower alkyl or phenyl radical and X³ is a lower alkyl radical.

Preferably X³ is the methyl radical. It is further preferred that Z' is an optionally substituted lower alkyl radical in particular an ethyl or γ-methoxypropyl radical.

The water-insoluble monoazo dyestuffs of the invention are valuable for colouring synthetic textile materials, in particular cellulose acetate and cellulose triacetate textile materials, polyamide textile materials such as polyhexamethyleneadipamide textile materials, and preferably aromatic polyester textile materials such as polyethylene terephthalate textile materials. Such textile materials can be in the form of thread, yarn, or woven or knitted fabric.

Such textile materials can conveniently be coloured with the monoazo dyestuffs, as hereinbefore defined, by immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile materials it is preferred to carry out the dyeing process at a temperature between 60° and 85°C.; in the case of cellulose triacetate or polyamide textile material it is preferred to carry out the dyeing process at 95° to 100°C.; in the case of aromatic polyester textile materials the dyeing process can either be carried out at a temperature between 90° and 100°C., preferably in the presence of a carrier such as diphenyl or o-hydroxydiphenyl, or at a temperature above 100°C., preferably at a temperature between 120° and 130°C., under superatmospheric pressure.

Alternatively the aqueous dispersion of the said monoazo dyestuff can be applied to the textile material by a padding or printing process, followed by heating or steaming of the textile material. In such processes it is preferred to incorporate a thickening agent, such as gum tragacanth, gum arabic, or sodium alginate, into the aqueous dispersion of the said monoazo dyestuff.

At the conclusion of the colouring process it is preferred to give the coloured textile material a rinse in water or a brief soaping treatment before finally drying the coloured textile material. In the case of aromatic polyester textile materials it is also preferred to subject the coloured textile material to a treatment in an alkaline aqueous solution of sodium hydrosulphite before the soaping treatment in order to remove loosely attached dyestuff from the surface of the textile material.

The monoazo dyestuffs have excellent affinity and building up properties on synthetic textile materials, and in particular on aromatic polyester textile materials, so enabling heavy depths of shade to be obtained. The resulting colorations which range in shade from yellow to violet, have excellent fastness to light, to wet treatments, and, in particular, to dry heat treatments such as those carried out at high temperatures during pleating operations.

If desired the dyestuffs of the invention can be applied to synthetic textile materials in conjunction with other disperse dyes, such as are described in, for example, British Pat. Nos. 806271, 835819, 840903, 847175, 852396, 852493, 859899, 865328, 872204, 894012, 908656, 909843, 910306, 913856, 919424, 944513, 944722, 953887, 959816, 960235, and 961412.

The invention is illustrated but not limited by the following Examples in which the parts are percentages are by weight.

EXAMPLE 1

Ten parts of a 14 percent aqueous solution of sodium nitrite are added to a solution of 1.9 parts of aniline in a mixture of 100 parts of water and 25 parts of a 7.1 percent aqueous solution of hydrochloric acid, the temperature being maintained between 0° and 5°C. by external cooling. The resulting solution of the diazo compound is then gradually added to a solution of 4.5 parts of 1-phenyl-3-cyano-4-methyl-6-hydroxypyrid-2-one and 5 parts of sodium acetate in 100 parts of a 1 percent solution of sodium hydroxide at a temperature between 0° and 5°C., and the mixture is stirred for 15 minutes at the same temperature. The mixture is then acidified with acetic acid, and the precipitated dyestuff is filtered off, washed with water and dried.

When dispersed in aqueous medium the so-obtained dyestuff dyes aromatic polyester textile materials in greenish-yellow shades of excellent fastness to light, to washing and to dry heat treatments. The dyestuff also has excellent build-up properties on polyester textile materials so enabling heavy depths of shade to be readily obtained.

The 1-phenyl-3-cyano-4-methyl-6-hydroxypyrid-2-one used in the above Example was itself obtained by condensing acetoacetanilide with ethyl cyanoacetate in the presence of sodium ethoxide.

The following Table gives further Examples of the monoazo dyestuffs of the invention which are obtained by diazotising the amines listed in the second column of the Table, and coupling the resulting diazo compounds with the coupling components listed in the third column of the Table by methods similar to that described in Example 1. The fourth column of the Table gives the shades obtained when the Dyestuffs are applied to aromatic polyester textile materials.

| Examples | Amine | Coupling Components | Shade |
| --- | --- | --- | --- |
| 2 | o-nitroaniline | 1-phenyl-3-cyano-4-methyl-6-hydroxypyrid-2-one | Greenish-yellow |
| 3 | o-chloroaniline | do. | do. |
| 4 | p-chloroaniline | do. | do. |
| 5 | ethyl p-aminobenzoate | do. | do. |
| 6 | 3-aminophenyl-N:N-dimethyl-sulphomate | do. | do. |
| 7 | β-ethoxyethyl-p-aminobenzoate | do. | do. |
| 8 | β-hydroxyethyl-p-aminobenzoate | do. | do. |
| 9 | p-toluidine | do. | do. |
| 10 | p-anisidine | do. | Reddish-yellow |
| 11 | aniline | do. | do. |
| 12 | ethyl p-aminobenzoate | 1-ethyl-3-cyano-4-methyl-6-hydroxypyrid-2-one | Greenish-yellow |
| 13 | β-ethoxyethyl-p-aminobenzoate | do. | do. |
| 14 | β-hydroxyethyl-p-aminobenzoate | do. | do. |
| 15 | o-nitroaniline | do. | do. |
| 16 | m-nitroaniline | do. | do. |
| 17 | p-nitroaniline | do. | do. |
| 18 | p-aminobenzenesulphonamide | do. | do. |
| 19 | p-aminobenzene sulphon-N-ethyl-amide | do. | do. |
| 20 | 2:4-dichloroaniline | do. | do. |
| 21 | 2:4:5-trichloroaniline | do. | do. |
| 22 | p-toluidine | do. | do. |
| 23 | p-anisidine | do. | Reddish-yellow |
| 24 | p-aminoacetanilinde | do. | do. |
| 25 | N-(p-aminophenyl)phthalimide | do. | Orange |
| 26 | aniline | 1-(γ-methoxypropyl)-3-cyano-4-methyl-6-hydroxypyrid-2-one | Greenish-yellow |
| 27 | p-chloroaniline | do. | do. |
| 28 | ethyl-p-aminobenzoate | do. | do. |
| 29 | 3-aminophenyl-N:N-dimethyl-sulphamate | do. | do. |
| 30 | aniline | 1-(β-hydroxyethyl)-3-cyano-4-methyl-6-hydroxy-pyrid-2-one | do. |
| 31 | p-chloroaniline | do. | do. |
| 32 | p-nitroaniline | do. | do. |
| 33 | ethyl p-aminobenzoate | do. | do. |
| 34 | p-aminobenzenesulphonamide | do. | do. |

-Continued

| Examples | Amine | Coupling Components | Shade |
|---|---|---|---|
| 35 | 2:4-dichloroaniline | 1-phenyl-3-cyano-4-methyl-6-hydroxypyrid-2-one | do. |
| 36 | β-methoxyethyl 4-amino-benzoate | do. | do. |
| 37 | 4-aminobenzene sulphon-N-ethylamide | do. | do. |
| 38 | aniline | 1-(p-methoxyphenyl)-3-cyano-4-methyl-6-hydroxypyrid-2-one | |
| 39 | 4-chloroaniline | do. | do. |
| 40 | do. | 1-(p-N-ethylsulphamoylphenyl)-3-cyano-4-methyl-6-hydroxypyrid-2-one | do. |
| 41 | aniline | do. | do. |
| 42 | 2-aminno-p-xylene | 1-ethyl-3-cyano-4-methyl-6-hydroxypyrid-2-one | Reddish-yellow |
| 43 | 4-chloroaniline | do. | Greenish-yellow |
| 44 | 2:5-dichloroaniline | do. | do. |
| 45 | 2:4:6-trichloroaniline | do. | do. |
| 46 | 2-chloro-4-nitroaniline | do. | do. |
| 47 | 2-methoxy-4-nitroaniline | do. | Reddish-yellow |
| 48 | 2-methoxy-5-nitroaniline | do. | do. |
| 49 | 4-methoxy-2-nitroaniline | do. | Orange |
| 50 | β-methoxyethyl 4-aminobenzoate | do. | Greenish-yellow |
| 51 | dimethyl aminoterephthalate | do. | do. |
| 52 | 3-aminophenyl-N:N-dimethyl sulphamate | do. | do. |
| 53 | 4-aminobenzenesulphon-N-n-propylamide | do. | do. |
| 54 | 4-aminobenzenesulphon-N:N-dimethylamide | do. | do. |
| 55 | 4-aminobenzenesulphon-N:N-di(n-propyl)amide | do. | do. |
| 56 | 4-aminobenzenesulphon-N-phenyl-N-ethylamide | do. | do. |
| 57 | 3-aminobenzenesulphon-N:N-dimethylamide | do. | do. |
| 58 | 4-aminobenzamide | do. | do. |
| 59 | 4-aminobenz-N-ethylamide | do. | do. |
| 60 | 4-aminobenz-N:N-diethylamide | do. | do. |
| 61 | 5-chloro-2-methylaniline | do. | do. |
| 62 | 5-chloro-2-methoxyaniline | do. | Reddish-yellow |
| 63 | 4-methyl-2-nitroaniline | do. | do. |
| 64 | 2-methyl-4-nitroaniline | do. | do. |
| 65 | 4-chloro-2-nitroaniline | do. | do. |
| 66 | 2-methyl-5-nitroaniline | do. | Greenish-yellow |
| 67 | β-methoxyethyl 3-aminobenzoate | do. | do. |
| 68 | 3-aminobenzene sulphon-N-ethylamide | do. | do. |
| 69 | 3-aminobenzenesulphon-N:N-diethylamide | do. | do. |
| 70 | 4-chloro-2-methylaniline | do. | do. |
| 71 | 4-chloro-2-methoxyaniline | do. | Reddish-yellow |
| 72 | β-methhoxyethyl 2-aminobenzoate | do. | Greenish-yellow |
| 73 | β-(β'-methoxyethoxy)ethyl 4-aminobenzoate | do. | do. |
| 74 | β-(β'-ethoxyethoxy)ethyl 4-aminobenzoate | do. | do. |
| 75 | α:β-bis(methoxy)isopropyl 4-aminobenzoate | do. | do. |
| 76 | 4-aminobenzenesulphon-N-ethylamide | 1-(γ-methoxypropyl)-3-cyano-4-methyl-6-hydroxypyrid-2-one | do. |
| 77 | 2:4-dichloroaniline | do. | do. |
| 78 | 2:4:6-trichloroaniline | do. | do. |
| 79 | 5-chloro-2-methylaniline | do. | do. |
| 80 | 5-chloro-2-methoxyaniline | do. | Reddish-yellow |
| 81 | 2-nitroaniline | do. | Greenish-yellow |
| 82 | 3-nitroaniline | do. | do. |
| 83 | 4-nitroaniline | do. | do. |
| 84 | 4-methyl-2-nitroaniline | do. | Reddish-yellow |
| 85 | 2-methyl-5-nitroaniline | do. | do. |
| 86 | 2-methyl-4-nitroaniline | do. | do. |
| 87 | 4-chloro-2-nitroaniline | do. | Yellow |
| 88 | 2-chloro-4-nitroaniline | do. | do. |
| 89 | β-methoxyethyl 4-aminobenzoate | do. | Greenish-yellow |
| 90 | 4-aminobenzenesulphon-N:N-diethylamide | do. | do. |
| 91 | 3-aminobenzenesulphon-N:N-diethylamide | do. | do. |
| 92 | 3-aminobenzenesulphon-N-ethylamide | do. | do. |
| 93 | 4-chloro-2-methylaniline | do. | Yellow |
| 94 | 4-chloro-2-methoxyaniline | do. | Reddish-yellow |
| 95 | 4-methoxy-2-nitroaniline | do | Orange |
| 96 | 2-methoxy-5-nitroaniline | do. | Yellow |
| 97 | 2-methoxy-4-nitroaniline | do. | Orange |
| 98 | 2:4:5-trichloroaniline | 1-(β-hydroxyethyl)-3-cyano-4-methyl-6-hydroxypyrid-2-one | Greenish-yellow |
| 99 | 2-nitroaniline | do. | do. |
| 100 | 3-nitroaniline | do. | do. |
| 101 | β-methoxyethyl 4-aminobenzoate | do. | do. |
| 102 | β-hydroxyethyl 4-aminobenzoate | do. | do. |
| 103 | 4-aminoacetanilide | do. | Orange |
| 104 | 4-aminobenzenesulphon-N-ethylamide | do. | Greenish-yellow |
| 105 | 4-aminobenzamide | do. | do. |
| 106 | 4-aminobenz-N-ethylamide | do. | do. |
| 107 | 4-diethylaminoaniline | 1-ethyl-3-cyano-4-methyl-6-hydroxypyrid-2-one | Violet |
| 108 | 1-naphthylamine | do. | Reddish-yellow |
| 109 | 2-chloro-1-naphthylamine | do. | do. |
| 110 | 1-aminoanthraquinone | do. | do. |

-Continued

| Examples | Amine | Coupling Components | Shade |
|---|---|---|---|
| 111 | 2-aminoanthraquinone | do. | do. |
| 112 | 4-aminodiphenyl | do. | Greenish-yellow |
| 113 | 4-chloroaniline | 1-benzyl-3-cyano-4-methyl-6-hydroxypyrid-2-one | do. |
| 114 | 2-nitroaniline | do. | do. |
| 115 | do. | 1-(o-tolyl)-3-cyano-4-methyl-6-hydroxypyrid-2-one | do. |
| 116 | 4-chloroaniline | do. | do. |
| 117 | do. | 1-(o-methoxyphenyl)-3-cyano-4-methyl-6-hydroxypyrid-2-one | do. |
| 118 | 2-nitroaniline | do. | do. |
| 119 | 2-nitroaniline | 1-(2':4'-dimethylphenyl)-3-cyano-4-methyl-6-hydroxypyrid-2-one | do. |
| 120 | 4-chloroaniline | do. | do. |
| 121 | 4-methoxy-2-nitroaniline | do. | do. |
| 122 | 2-nitroaniline | 1-(p-chlorophenyl)-3-cyano-4-methyl-6-hydroxypyrid-2-one | do. |
| 123 | 2-chloroaniline | 1-(naphth-1'-yl)-3-cyano-4-methyl-6-hydroxypyrid-2-one | do. |
| 124 | 4-chloroaniline | do. | do. |
| 125 | 3-nitroaniline | 1-ethyl-3-carboethoxy-4-methyl-6-hydroxypyrid-2-one | do. |
| 126 | do. | 1-ethyl-3-carbobenzyloxy-4-methyl-6-hydroxypyrid-2-one | do. |
| 127 | 4-methoxy-22-nitroaniline | do. | Orange |
| 128 | 2:4-dichloroaniline | 1-ethyl-3-carbamoyl-4-methyl-6-hydroxypyrid-2-one | Greenish-yellow |
| 129 | do. | 1-ethyl-3-N:N-diethylcarbamoyl-4-methyl-6-hydroxypyrid-2-one | do. |
| 130 | 2-chloroaniline | 1-ethyl-3-N-phenylcarbamoyl-4-methyl-6-hydroxypyrid-2-one | do. |
| 131 | ethyl-4-aminobenzoate | do. | do. |
| 132 | 2-nitroaniline | do. | do. |
| 133 | 4-methoxy-2-nitroaniline | do. | Orange |
| 134 | 2-methoxy-4-nitroaniline | do. | do. |
| 135 | 3-nitroaniline | do. | Greenish-yellow |
| 136 | 4-chloroaniline | 1-ethyl-3-(piperidin-1'-ylcarbonyl-4-methyl-6-hydroxypyrid-2-one | do. |
| 137 | 2-nitroaniline | do. | do. |
| 138 | 4-chloroaniline | 1-ethyl-3-acetyl-4-methyl-6-hydroxypyrid-2-one | do. |
| 139 | 4-diethylaminoaniline | do. | Violet |
| 140 | 4-diethylamino-2-methylaniline | do. | Bluish-violet |
| 141 | 4-chloroaniline | 1-ethyl-3-cyano-4-ethoxycarbonylmethyl-6-hydroxypyrid-2-one | Greenish-yellow |
| 142 | do. | 1-ethyl-3-cyano-4-carboethoxy-6-hydroxypyrid-2-one | do. |
| 143 | 2-nitroaniline | do. | do. |
| 144 | ethyl-4-aminobenzoate | do. | do. |
| 145 | 4-methoxy-2-nitroaniline | 1-ethyl-3-cyano-4-carbamoyl-6-hydroxypyrid-2-one | Orange |
| 146 | 3-nitroaniline | 1-ethyl-3-cyano-4-N-ethylcarbamoyl-6-hydroxypyrid-2-one | Greenish-yellow |
| 147 | 3-nitroaniline | do. | do. |
| 148 | 4-chloroaniline | do. | do. |
| 149 | 2-methoxyaniline | do. | Reddish-yellow |
| 150 | 2-methoxy-4-nitroaniline | do. | Orange |
| 151 | 4-methoxy-2-nitroaniline | do. | do. |
| 152 | do. | 1-ethyl-3-cyano-4-phenyl-6-hydroxypyrid-2-one | do. |
| 153 | do. | 1-ethyl-3-cyano-4-(p-methoxyphenyl)-6-hydropypyrid-2-one | do. |
| 154 | do. | 1-ethyl-3-cyano-4-(p-chlorophenyl)-6-hydroxypyrid-2-one | do. |
| 155 | do. | 1-ethyl-3-cyano-4-(N-ethylcarbamoylmethyl)-6-hydroxypyrid-2-one | do. |
| 156 | 4-chloroaniline | 1-ethyl-4-N-ethylcarbamoyl-6-hydroxypyrid-2-one | Greenish-yellow |
| 157 | do. | 1-ethyl-4-carboethoxy-6-hydroxypyrid-2-one | do. |
| 158 | 2:4-dinitro-6-bromoaniline | 1-ethyl-3-cyano-4-methyl-6-hydroxypyrid-2-one | Yellow |
| 159 | 2-cyano-4-nitroaniline | do. | do. |
| 160 | 4-methylsulphonylaniline | do. | do. |
| 161 | 2-trifluoromethylaniline | do. | do. |
| 162 | 4-acetylaniline | do. | do. |
| 163 | 2-nitroaniline | 1-ethyl-3-cyano-4-cyanomethyl-6-hydroxypyrid-2-one | do. |
| 164 | 4-chloroaniline | do. | do. |
| 165 | do. | 1-ethyl-3-cyano-4-acetylmethyl-6-hydroxypyrid-2-one | do. |
| 166 | 2-nitroaniline | do. | do. |

The 1-ethyl-3-cyano-4-methyl-6-hydroxypyrid-2-one used in the above Examples was obtained by condensing together ethyl acetoacetate, ethyl cyanoacetate and ethylamine.

The 1-(γ-methoxypropyl)-3-cyano-4-methyl-6-hydroxypyrid-2-one used in the above Examples was obtained by condensing together ethyl acetoacetate, ethyl cyanoacetate and γ-methoxypropylamine.

The 1-(β-hydroxyethyl)-3-cyano-4-methyl-6-hydroxypyrid-2-one used in the above Examples was obtained by condensing together ethyl acetoacetate, ethyl cyanoacetate and β-hydroxyethylamine.

The 1-(o-methoxyphenyl)-3-cyano-4-methyl-6-hydroxypyrid-2-one, 1-(p-methoxyphenyl)-3-cyano-4-methyl-6-hydroxypyrid-2-one, 1-(o-tolyl)-3-cyano-4-methyl-6-hydroxypyrid-2-one, 1-(p-N-ethylsulphamoylphenyl)-3-cyano-4-methyl-6-hydroxypyrid-2-one, 1-(2':4'-dimethylphenyl)-3-cyano-4-methyl-6-hydroxypyrid-2-one, and 1-(p-chlorophenyl)-3-cyano-4-methyl-6-hydroxypyrid-2-one, used in the above Examples were obtained by condensing the appropriately substituted acetoacetanilide with ethyl cyanoacetate in the presence of sodium ethoxide.

1-Benzyl-3-cyano-4-methyl-6-hydroxypyrid-2-one was obtained by condensing together ethyl acetoacetate, ethyl cyanoacetate and benzylamine.

1-(Naphth-1'-yl)-3-cyano-4-methyl-6-hydroxypyrid-2-one was obtained by condensing acetoacet-1-naphthylamide with ethylcyanoacetate in the presence of sodium ethoxide.

1-Ethyl-3-carboethoxy-4-methyl-6-hydroxypyrid-2-one was obtained by condensing acetoacetethylamide with diethylmalonate in the presence of sodium ethoxide. This product on transesterification with benzyl alcohol gave 1-ethyl-3-carbobenzyloxy-4-methyl-6-hydroxypyrid-2-one.

1-Ethyl-3-(carbamoyl, N:N-diethylcarbamoyl, N-phenylcarbamoyl or piperidin-1'-ylcarbamoyl)-4-methyl-6-hydroxypyrid-2-one were obtained by treating 1-ethyl-3-carboethoxy-4-methyl-6-hydroxypyrid-2-one with, ammonia, diethylamine, aniline and piperidine respectively.

1-Ethyl-3-acetyl-4-methyl-6-hydroxypyrid-2-one was obtained by reacting 1-ethyl-4-methyl-6-hydroxypyrid-2-one with acetyl chloride in the presence of aluminum chloride.

1-Ethyl-3-cyano-4-ethoxycarbonylmethyl-6-hydroxypyrid-2-one was obtained by condensing ethylacetone dicarboxylate with cyanoacetethylamide in the presence of sodium ethoxide.

1-Ethyl-3-cyano-4-carboethoxy-6-hydroxypyrid-2-one was obtained by condensing the diethyl ester of oxaloacetic acid with cyanoacetethylamide in the presence of sodium ethoxide. This product on treatment with ammonia, ethylamine or aniline gave the corresponding 4-carbamoyl derivatives.

1-Ethyl-3-cyano-4-(phenyl, p-methoxyphenyl and p-chlorophenyl)-6-hydroxypyrid-2-one were obtained by condensing together ethyl benzoylacetate or the p-methoxy or p-chloro derivatives thereof, ethyl cyanoacetate and ethylamine.

1-Ethyl-3-cyano-4-(N-ethylcarbamoylmethyl)-6-hydroxypyrid-2-one was obtained by reacting 1-ethyl-3-cyano-4-ethoxycarbonylmethyl-6-hydroxypyrid-2-one with ethylamine.

1-ethyl-4-N-ethylcarbamoyl-6-hydroxypyrid-2-one was obtained by heating a mixture of citric acid and ethylamine under pressure. This compound on hydrolysis and subsequent esterification gave 1-ethyl-4-carboethoxy-6-hydroxypyrid-2-one.

1-ethyl-3-cyano-4-cyanomethyl-6-hydroxypyrid-2-one was obtained by condensing together ethyl cyanoacetoacetate, ethyl cyanoacetate and ethylamine.

1-ethyl-3-cyano-4-acetylmethyl-6-hydroxypyrid-2-one was obtained by condensing together ethyl 3:5-dioxohexanoate, ethyl cyanoacetate and ethylamine.

We claim:
1. Water-insoluble monoazo dyestuff free from sulphonic acid and carboxylic acid groups having the general formula,

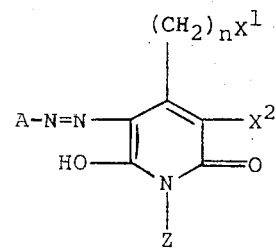

wherein A is selected from the group consisting of phenyl, naphthyl and phenyl substituted with a member selected from the group consisting of chlorine, bromine, cyano, trifluoromethyl, nitro, lower alkyl, lower alkoxy, lower alkylsulphonyl, lower alkyl carbonyl, acetylamino, di(lower alkyl) amino, phthalyl, carbo lower alkoxy, carbo lower alkoxy lower alkoxy, carbo hydroxy lower alkoxy, sulphonamido, N-lower alkyl sulphonamido, N:N-di(lower alkyl) sulphonamido, N-phenyl sulphonamido, carbonamido, N-lower alkyl carbonamido, N:N-di(lower alkyl) carbonamido, sulphomato, N-lower alkyl sulphamato and N:N-di(lower alkyl) sulphamato; $n$ is an integer of 0–1; Z is selected from the group consisting of lower alkyl, hydroxy lower alkyl, lower alkoxy lower alkyl, benzyl, naphthyl, phenyl and phenyl substituted by a substituent selected from the group consisting of lower alkyl, chlorine, lower alkoxy and sulphonamido;

$X^2$ is selected from the group consisting of cyano, carbo lower alkoxy, lower alkyl carbonyl and —$CONR^1R^2$, and $X^1$ is selected from the group consisting of hydrogen and lower alkyl, wherein $R^1$ and $R^2$ each independently are selected from the group consisting of hydrogen, lower alkyl and phenyl and $R^1$ and $R^2$, together with the nitrogen atom to which they are attached, form the ring selected from the group consisting of morpholino, piperidino and pyrrolidino rings.

2. Water-insoluble monoazo dyestuff free from sulphonic acid and carboxylic acid groups having the general formula

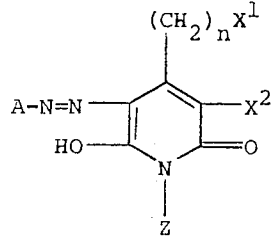

wherein A is selected from the group consisting of phenyl, naphthyl and phenyl substituted with a member selected from the group consisting of chlorine, bromine, cyano, trifluoromethyl, nitro, lower alkyl, lower alkoxy, lower alkylsulphonyl, lower alkyl carbonyl, acetylamino, di(lower alkyl) amino, phthalyl, carbo lower alkoxy, carbo lower alkoxy lower alkoxy, carbo hydroxy lower alkoxy, sulphonamido, N-lower alkyl sulphonamido, N:N-di(lower alkyl) sulphonamido, N- phenyl sulphonamido, carbonamido, N-lower alkyl carbonamido, N:N-di (lower alkyl) carbonamido, sulphamato, N-lower alkyl sulphamato and N:N-di(lower alkyl) sulphamato; Z is selected from the group consisting of lower alkyl, hydroxy lower alkyl, lower alkoxy lower alkyl, benzyl, naphthyl, phenyl and phenyl substituted by a substituent selected from the group consisting of lower alkyl, chlorine, lower alkoxy and sulphonamido;

$n = 1$;

one of $X^1$ and $X^2$ is selected from the group consisting of cyano, carbo lower alkoxy, lower alkylcarbonyl and —$CONR^1R^2$, and the other of $X^1$ and $X^2$ is selected from the group consisting of hydrogen, lower alkyl, phenyl, phenyl substituted by a substituent selected from the group consisting of lower alkyl, lower alkoxy, chlorine, cyano, carbo lower alkoxy, lower alkyl carbonyl and —$CONR^1R^2$, wherein $R^1$ and $R^2$ each independently are selected from the group consisting of hydrogen, lower alkyl and phenyl and $R^1$ and $R^2$, together with the nitrogen atom to which they are attached, form the ring selected from the group consisting of morpholino, piperidino and pyrrolidino rings.

3. A virtually water-insoluble azo compound free from sulfonic acid groups and having the formula

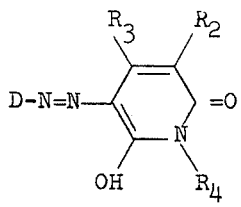

wherein D is phenyl, naphthyl or substituted phenyl, wherein each substituent of substituted phenyl is independently, chloro, bromo, cyano, nitro, trifluoromethyl, lower alkyl, lower alkoxy, lower alkylsulfonyl, lower alkanoyl, acetamido, lower alkoxy carbonyl, N,N-dilower alkylamino, lower alkoxy substituted lower alkoxycarbonyl, sulfamoyl, N-lower alkylsulfamoyl, N,N-dilower alkylsulfamoyl or N-phenylsulfamoyl, $R_2$ is cyano, lower alkoxycarbonyl, lower alkanoyl, N-lower alkylcarbamoyl or N,N-dilower alkylcarbamoyl, $R_3$ is lower alkyl and $R_4$ is lower alkyl or monosubstituted lower alkyl wherein the substituent of monosubstituted lower alkyl is hydroxy or lower alkoxy.

4. A compound of the formula

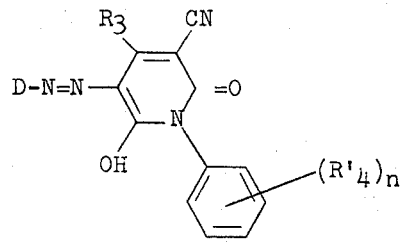

wherein D is phenyl or substituted phenyl, wherein each substituent of substituted phenyl is chloro, nitro, lower alkyl, lower alkoxy, lower alkoxycarbonyl, lower alkoxy substituted lower alkoxycarbonyl, N-lower alkylsulfamoyl or N,N-dilower alkylsulfamoyloxy, $R_3$ is lower alkyl, $R'_4$ is chloro, lower alkyl or lower alkoxy and $n$ is 0, 1 or 2, with the proviso that $n$ must be 1 when $R'_4$ is other than methyl.

5. The water-insoluble monoazo dyestuff of claim 1 having the formula

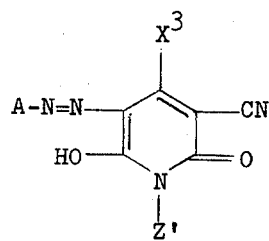

wherein A has the meaning given in claim 1; $X^3$ is lower alkyl; and $Z'$ is selected from the group consisting of lower alkyl, hydroxy lower alkyl, lower alkoxy lower alkyl and phenyl.

6. The water-insoluble monoazo dyestuff of claim 1 having the formula

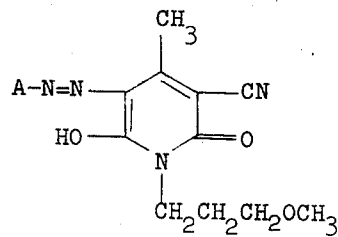

wherein A has the meaning given in claim 1.

7. The water-insoluble monoazo dyestuff of claim 1 having the formula

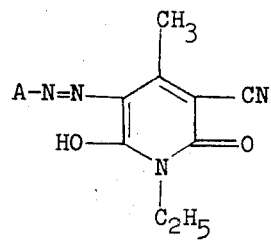

wherein A has the meaning given in claim 1.

* * * * *